United States Patent
Hibi

Patent Number: 5,823,911
Date of Patent: Oct. 20, 1998

[54] SUPPORTS FOR POWER ROLLERS FOR USE IN TOROIDAL-TYPE CONTINUOUSLY VARIABLE TRANSMISSIONS

[75] Inventor: Toshifumi Hibi, Yokosuka, Japan

[73] Assignee: Nissan Motor Co., Ltd., Yokohama, Japan

[21] Appl. No.: 739,442

[22] Filed: Oct. 29, 1996

[30] Foreign Application Priority Data

Oct. 30, 1995 [JP] Japan .................................. 7-281490

[51] Int. Cl.⁶ .................................................. F16H 15/38
[52] U.S. Cl. ................................................. 476/40; 476/46
[58] Field of Search ........................... 384/615, 609, 384/614, 564, 527; 476/46, 40, 42

[56] References Cited

U.S. PATENT DOCUMENTS

| | | | |
|---|---|---|---|
| 4,523,863 | 6/1985 | Okoshi | 385/615 X |
| 4,909,092 | 3/1990 | Machida et al. | 476/46 |
| 5,391,126 | 2/1995 | Fukushima et al. | 476/46 |
| 5,464,375 | 11/1995 | Nakano | 476/42 X |
| 5,482,382 | 1/1996 | Sato et al. | 384/609 X |
| 5,536,091 | 7/1996 | Takata et al. | 384/609 |
| 5,580,328 | 12/1996 | Aramaki | 476/40 |

FOREIGN PATENT DOCUMENTS

| | | |
|---|---|---|
| 62-2062 | 1/1987 | Japan . |
| 7-229549 | 8/1995 | Japan . |

*Primary Examiner*—Rodney H. Bonck
*Assistant Examiner*—Marcus Charles
*Attorney, Agent, or Firm*—Foley & Lardner

[57] ABSTRACT

A toroidal-type continuously variable transmission is constructed such that an action line of a load on a ball or rolling element is inclined with respect to a power roller rotation axis so that a point of intersection of the action line and the power roller rotation axis is positioned farther than an outer ring support surface of a power roller support member with respect to an inner ring of the power roller.

3 Claims, 4 Drawing Sheets

SUPPORTS FOR POWER ROLLERS FOR USE IN TOROIDAL-TYPE CONTINUOUSLY VARIABLE TRANSMISSIONS

BACKGROUND OF THE INVENTION

The present invention relates generally to toroidal-type continuously variable transmissions and more particularly, to supports for power rollers for use therein.

Various types of continuously variable transmissions have been proposed, one of which is a toroidal-type continuously variable transmission comprising input and output discs and a power roller frictionally engaged therewith for ensuring power transmission.

As is known, e.g., from in JP-A 62-2062, the toroidal-type continuously variable transmission is constructed such that an inner ring of the power roller receives a load from the input and output discs in accordance with a power roller holding force, which is input to an outer ring support surface of the trunnion via balls or rolling elements and an outer ring. Upper and lower ends of the trunnion are supported by upper and lower links, respectively, so as not to produce lateral displacement, which may cause deformation of the trunnion on the upper and lower ends thereof.

With conventional supports for power rollers, since an action line of the load on the ball is parallel to the power roller rotation axis, i.e., a power roller support bearing comprising balls is of the thrust type, the load input to the trunnion acts thereon widely from a center to portions close to the upper and lower ends. As a result, the trunnion is curved or deformed more largely in the center than at the upper and lower ends.

On the other hand, the outer ring of the power roller, which has relatively low rigidity, is deformed in accordance with deformation of the trunnion, whereas the inner ring of the power roller, which has relatively high rigidity, is not deformed in accordance with deformation of the trunnion. Therefore, even if all the balls receive substantially the same load before deformation of the trunnion, ones of the balls closer to the center of the trunnion receive smaller load, and the others of the balls closer to the upper and lower ends of the trunnion receive greater load after deformation of the trunnion. That is, the distribution of load to the balls becomes uneven, so that the outer ring of the power roller, which is always in the stationary state, has greater wear or fatigue in portions close to the upper and lower ends of the trunnion than in the other portions, resulting in remarkable lowering of the durability thereof.

The following propositions are made to solve the above problem with the power roller support bearing comprising balls being of the thrust type. One is to decrease the arrangement pitch circle diameter of the balls without changing the support span of the trunnion. Another is to increase the support span of the trunnion without changing the arrangement pitch circle diameter of the balls. That is, such propositions enable a reduction in the difference in the amount of deformation of the trunnion in an area with the balls arranged, resulting in restrained unevenness of the distribution of load to the balls.

However, the former proposition, which needs decreased number of balls, is difficult to realize since the durability of the balls is lowered due to increased bearing pressure of the power roller support bearing. Moreover, the latter proposition, which needs increased size of the trunnion and thrus increased size of the continuously variable transmission, is also difficult to realize when such increased size of the transmission is not allowed. Thus, it can be concluded that the above problem is difficult to solve with the power roller support bearing comprising balls being of the thrust type.

On the other hand, JP-A 7-229549 proposes a toroidal-type continuously variable transmission, where the power roller support bearing is not of the thrust type, but of the angular contact type in which the action line of the load on the ball is inclined with respect to the power roller rotation axis.

However, JP-A 7-229549 only discloses that the action line of the load on the ball is inclined with respect to the power roller rotation axis in the desired direction, and fails to teach in what relationship with the trunnion the action line is inclined. Moreover, in view of its object of easing a bending stress of the power roller, this reference can neither produce an operation and effect to prevent the occurrence of deformation of the trunnion, causing uneven distribution of load to the balls, nor solve the problem where the outer ring of the power roller has greater wear or fatigue in the portions close to the upper and lower ends of the trunnion than in the other portions, resulting in remarkable lowering of the durability thereof.

It is, therefore, an object of the present invention to provide the supports for power rollers for use in toroidal-type continuously variable transmissions that improve the durability of the outer ring of the power roller.

SUMMARY OF THE INVENTION

According to the present invention, there is provided a continuously variable transmission comprising:

input and output discs;

a power roller held between said input and output discs for power transmission, said power roller having a rotation axis, said power roller including an inner ring that frictionally contacts said input and output discs and an outer ring that receives, through a rolling element a load input from said input and output discs to said inner ring; and a support member arranged to rotatably support said power roller, said support member being slantingly rotatable about an oscillating axis perpendicular to said rotation axis of said power roller, said outer ring of said power roller being supported in a direction of said rotation axis of said power roller by a surface of said support member to sustain said load, wherein an action line of said load on said rolling element is inclined with respect to said rotation axis of said power roller so that a point of intersection of said action line and said rotation axis is positioned farther than said surface of said support member with respect to said inner ring of said power roller.

DETAILED DESCRIPTION OF THE INVENTION

Figure 1:
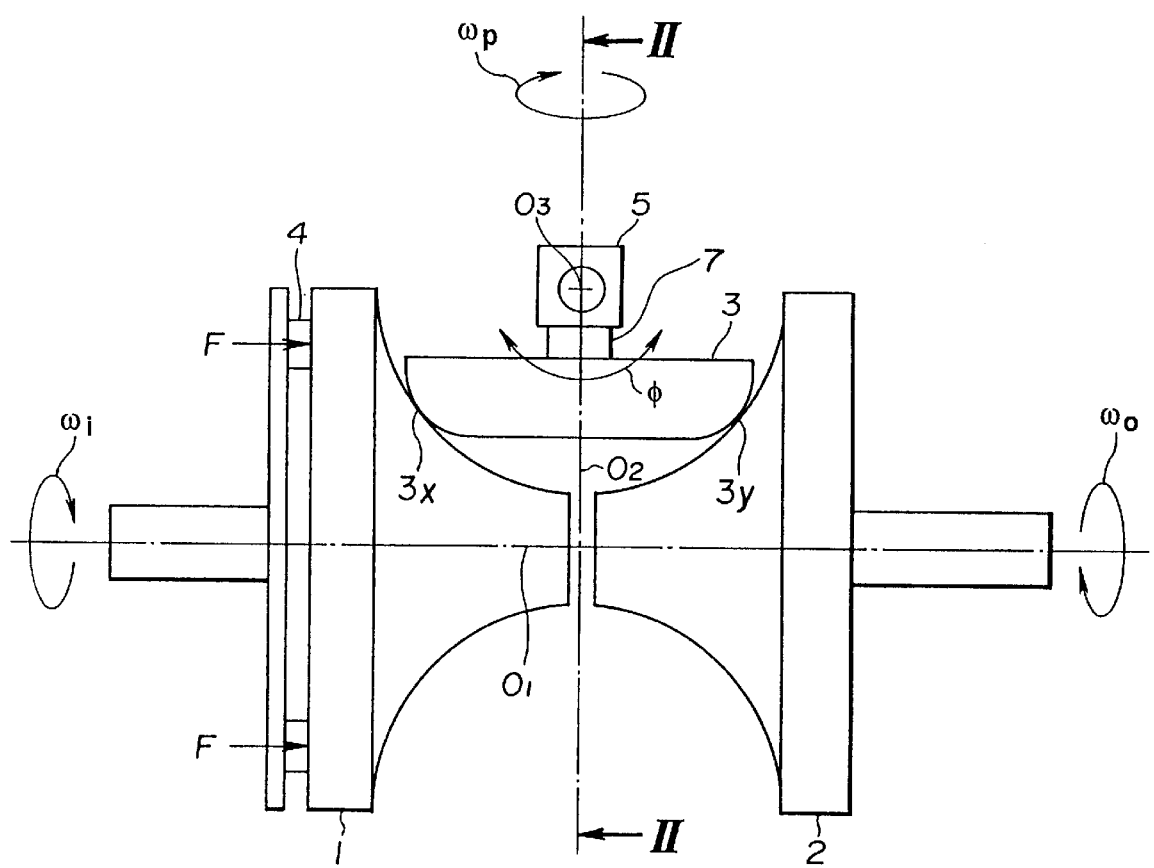
FIG. 1 is a diagrammatic view showing a toroidal-type continuously variable transmission to which the present invention is applied.

Referring to FIG. 1, a toroidal-type continuously variable transmission to which the present invention is applied comprises input and output discs 1, 2 and a power roller or traction roller 3 frictionally engaged therewith for ensuring power transmission.

The input disc 1 receives rotation through a loading cam 4, which gives then a thrust F to the input disc 1 in accordance with transmission input torque. Thus, the power roller 3 is held between the input and output discs 1, 2 by a force in accordance with transmission input torque, ensuring power transmission between the input and output discs 1, 2 through shearing of oil films at points of contact 3$x$, 3$y$ of the power roller 3 and the input and output discs 1, 2.

Specifically, a rotation $\omega_i$ of the input disc 1 is transmitted to the power roller 3 through shearing of the oil films. Then, a rotation $\omega_p$ of the power roller 3 is transmitted to the output disc 2 through shearing of the oil films to produce a rotation $\omega_p$ of the output disc 2. Likewise, power transmission of the output disc 2 to the input disc 1 is ensured through the power roller 3.

The power roller 3 is rotatably supported on a trunnion or power roller support member 5 through a pivot shaft 7. The trunnion 5 is disposed in a plane perpendicular to a rotation axis $O_1$ of the input and output discs 1, 2 and bisecting the distance therebetween. The trunnion 5 is slantingly rotatable together with the power roller 3 about an oscillating axis $O_3$ perpendicular to a power roller rotation axis $O_2$ as shown by $\phi$, which ensures a continuous change of the diameter of a circle of locus formed by the power roller 3 contacting the input and output discs 1, 2, enabling continuous shifting.

Figure 2:
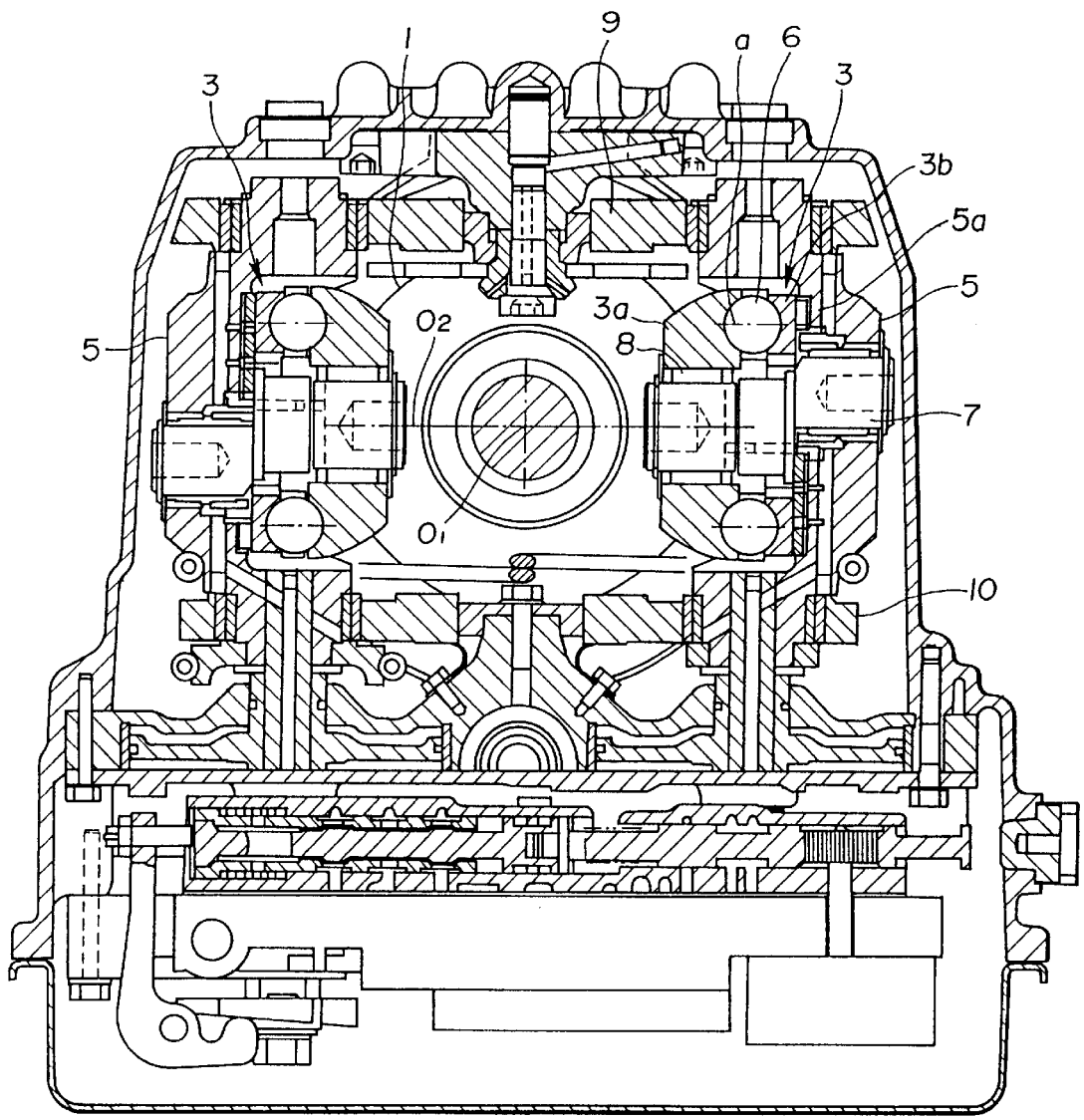
FIG. 2 is a longitudinal section taken along the line II—II in FIG. 1.

Referring to FIG. 2, the power roller 3 and its support will be described in detail. In the same way as in JP-A 62-2062, the power roller 3 comprises an inner ring 3$a$, which frictionally contacts the input and output discs 1, 2, and an outer ring 3$b$ which receives through balls or rolling elements 6 a load input from the input and output discs 1, 2 in accordance with the thrust F as shown in FIG. 1. The power roller 3 is supported on the trunnion 5 by the pivot shaft 7 such that the inner ring 3$a$ is rotatable on the pivot shaft 7 through a radial bearing 8, and the outer ring 3$b$ is supported in the direction of the power roller rotation axis $O_2$ by an outer ring support surface 5$a$ of the trunnion 5 so as to sustain the load input from the input and output discs 1, 2 through the balls 6.

Figure 3:
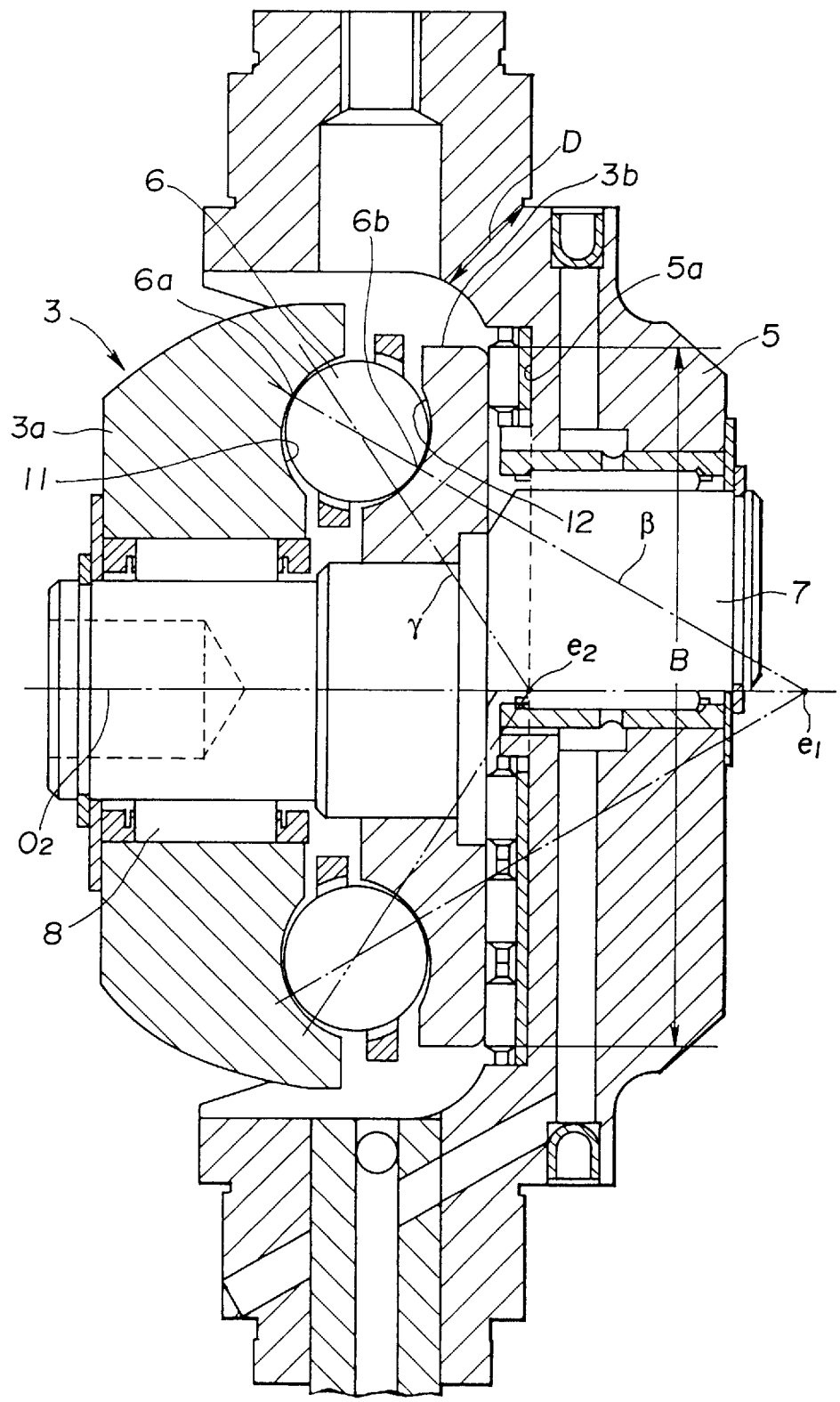
FIG. 3 is a longitudinal section showing a first preferred embodiment of supports for power rollers according to the present invention.

Referring to FIG. 3, a first embodiment of the present invention will be described. In the first embodiment, the power roller support bearing comprising balls or rolling elements 6 is of the angular contact type. Compared with the power roller support bearing of the thrust type as described above, the power roller support bearing of the angular contact type is such that the shape of ball rolling grooves 11, 12 of the inner and outer rings 3$a$, 3$b$ of the power roller 3 is determined so that a point of contact 6$a$ of the inner ring 3$a$ and the ball 6 is moved to go away from the power roller rotation axis $O_2$, and a point of contact 6$b$ of the outer ring 3$b$ and the ball 6 is moved to come near the power roller rotation axis $O_2$.

Thus, a line $\beta$ connecting the point of contact 6$a$ and the point of contact 6$b$ is inclined with respect to the power roller rotation axis $O_2$, and the two cross each other at a point $e_1$. The shape of the ball rolling grooves 11, 12 of the inner and outer rings 3$a$, 3$b$ is determined so that the point of intersection $e_1$ is positioned farther than the outer ring support surface 5$a$ of the trunnion or power roller support member 5 with respect to the inner ring 3$a$.

With such a structure, the load input to the input and output discs 1, 2 in accordance with the thrust or power roller holding force F as shown in FIG. 1 is transmitted to the outer ring 3$b$ of the power roller 3 through the ball 6, which is finally transmitted to the outer ring support surface 5$a$ of the trunnion 5.

At this time, the load is input from the inner ring 3$a$ to the ball 6 at the point of contact 6$a$, which is then transmitted from the ball 6 at the point of contact 6$b$ to the outer ring 3$b$, so that the line $\beta$ connecting the point of contact 6$a$ and the point of contact 6$b$ is an action line of the load on the ball 6.

Since the action line $\beta$ of the load on the ball 6 is inclined with respect to the power roller rotation axis $O_2$ so that the point of intersection $e_1$ is positioned farther than the outer ring support surface 5$a$ of the trunnion or power roller support member 5 with respect to the inner ring 3$a$, a point of action of the load with respect to the trunnion 5 can be set in the center of the trunnion 5 in the longitudinal direction thereof, obtaining a substantial equivalent of increased support span of the trunnion 5.

Thus, the trunnion 5 is deformed by the load input from the input and output discs 1, 2 through the ball 6, which does not cause, however, remarkably uneven distribution of the load of the balls 6, resulting in a possible solution of the problem of the conventional supports for power rollers where the outer ring 3$b$ of the power roller 3, which is always in the stationary state, has greater wear or fatigue in the portions close to the upper and lower ends of the trunnion 5 than in the other portions.

Experiments revealed that the best solution of the problem is obtained by the structure having an action line $\gamma$ of the load on the ball 6 further inclined with respect to the power roller rotation axis $O_2$ in the same direction so that a point of intersection $e_2$ of the two is positioned on the outer ring support surface 5$a$ of the trunnion 5.

According to the first embodiment, the point of contact 6$b$ of the outer ring 3$b$ of the power roller 3 and the ball 6 is displaced to come near the power roller rotation axis $O_2$ as described above, in accordance with which a diameter B of the outer ring 3$b$ of the power roller 3 is decreased. Thus, a portion D of the trunnion 5 covering the outer periphery of the outer ring 3$b$ can be thickened in accordance with a decrease in the diameter B of the outer ring 3$b$. Conventionally, the portion D forms a weak point of the trunnion 5 in view of the strength, which can be removed according to the first embodiment, enabling an increase in the strength of the trunnion 5, resulting in increased degree of freedom of the design of the supports for power rollers.

Figure 4:
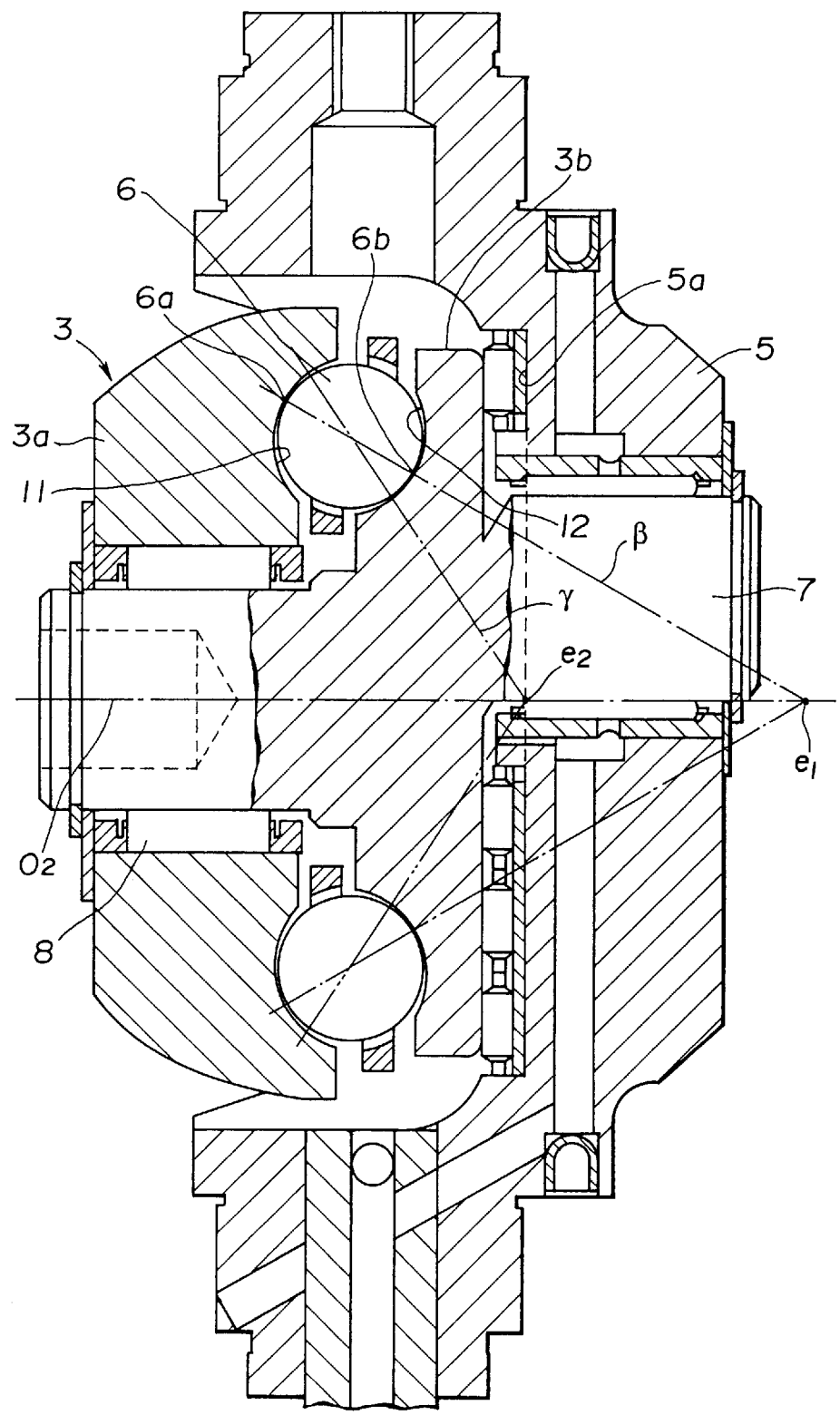
FIG. 4 is a view similar to FIG. 3, showing a second preferred embodiment of the present invention.

Referring to FIG. 4, a second embodiment of the present invention will be described, which is fundamentally similar to the first embodiment except that the outer ring 3$b$ is integrated with the pivot shaft 7 for rotatably mounting the power roller 3 to the trunnion 5.

According to the second embodiment, due to its increased strength with respect to the load input from the input and output discs 1, 2, the outer ring 3$b$ of the power roller 3 serves to decrease a load input to the trunnion 5, reducing deformation thereof, resulting in further developed operation and effect of the first embodiment to restrain unevenness of the distribution of load to the balls 6.

Having described the present invention in connection with the preferred embodiment, it is noted that the present invention is not limited thereto, and various changes and modifications can be made without departing from the spirit of the present invention.

What is claimed is:

1. A continuously variable transmission comprising:

input and output discs;

a power roller held between said input and output discs for power transmission, said power roller having a rotation axis, said power roller including an inner ring that frictionally contacts said input and output discs, a rolling element, and an outer ring that receives, through said rolling element, a load input from said input and output discs to said inner ring; and a support member arranged to rotatably support said power roller, said support member being rotatable about an oscillating axis that is perpendicular to said rotation axis of said power roller, wherein said outer ring of said power roller is supported in a direction of said rotation axis of said power roller by a surface of said support member to sustain said load, wherein an action line of said load on said rolling element is inclined with respect to said rotation axis of said power roller and intersects said rotation axis of said power roller at a point corresponding to said surface of said support member.

2. A continuously variable transmission as claimed in claim 1, wherein said outer ring of said power roller has a diameter sized in accordance with a point of contact of said rolling element and said outer ring is nearer to said rotation axis of said power roller than said inner ring.

3. A continuously variable transmission as claimed in claim 2, wherein said outer ring of said power roller is integrated with a pivot shaft for rotatably mounting said power roller to said support member.

* * * * *